United States Patent [19]

Steenblik et al.

[11] 4,350,412
[45] Sep. 21, 1982

[54] FRESNEL SPIRAL REFLECTOR AND METHOD FOR MAKING SAME

[75] Inventors: Richard A. Steenblik; Dar-Veig Ho, both of Atlanta, Ga.

[73] Assignee: Georgia Tech Research Institute, Atlanta, Ga.

[21] Appl. No.: 137,833

[22] Filed: Apr. 7, 1980

[51] Int. Cl.³ .............................................. G02B 5/08
[52] U.S. Cl. ................................... 350/292; 126/438; 350/299; 350/320
[58] Field of Search ........................ 350/288, 292–296, 350/299, 320; 126/438, 439, 451; 343/915

[56] References Cited

U.S. PATENT DOCUMENTS

| 1,421,506 | 7/1922 | Limpert | 350/294 |
|---|---|---|---|
| 2,791,214 | 5/1957 | Poliansky | 126/451 |
| 2,806,134 | 9/1957 | Tarcici | 350/292 |
| 2,806,135 | 9/1957 | Bolsey | 350/292 X |
| 2,945,417 | 7/1960 | Caryl et al. | 350/292 |
| 3,064,534 | 11/1962 | Tumavicus | 350/292 |
| 3,105,486 | 10/1963 | Glenn | 350/292 X |
| 3,176,303 | 3/1965 | Holland | 350/292 X |
| 3,337,871 | 8/1967 | Greenberg et al. | 350/296 UX |
| 4,093,351 | 6/1978 | Perkins et al. | 350/295 X |
| 4,097,126 | 6/1978 | Mehlein et al. | 350/295 |
| 4,110,009 | 8/1978 | Bunch | 350/292 |
| 4,116,541 | 9/1978 | Weiss | 350/296 |
| 4,131,336 | 12/1978 | Miller et al. | 350/292 |

FOREIGN PATENT DOCUMENTS 2640166 3/1978 Fed. Rep. of Germany ...... 126/438

Primary Examiner—F. L. Evans
Attorney, Agent, or Firm—Newton, Hopkins & Ormsby

[57] ABSTRACT

A spiral Fresnel reflector is formed by plotting a predetermined developed spiral on a flat sheet of reflecting material, cutting the flat sheet of reflecting material along the developed spiral and winding up the developed spiral until the spiral arms focus reflective light at a focal area. The developed spiral can have either a positive or a negative focal length.

29 Claims, 20 Drawing Figures

FRESNEL SPIRAL REFLECTOR AND METHOD FOR MAKING SAME

BACKGROUND OF THE INVENTION

1. Field of the Invention

The present invention relates to Fresnel reflectors and more specifically to spiral Fresnel reflectors.

2. Description of the Prior Art

There is a great need, particularly in the poor third world countries, for an inexpensive solar cooker which can cook food without the necessity of using valuable fuel. Traditionally, solar cookers have been in the form of paraboloids or hemispheres. However, such shapes are difficult to manufacture and in order to keep their shape they must be formed from metal, fiberglass or hard plastic. All of these materials are expensive and the forming processes for these materials are expensive. As a result, the finished cooker is also expensive. Further, such shapes are bulky and require a disproportionate amount of space when shipped. Since shipping volume is expensive, the cost is again increased.

A Fresnel Reflector is a reflector made from a flat sheet of material and having concentric rings which have an identical focal point. The use of a Fresnel reflector as a solar cooker would be advantageous since all of the parts of the Fresnel reflector could be cut from one sheet of material and there would be no complex three dimensional shapes to manufacture; the Fresnel reflector could be made out of inexpensive materials such as aluminized cardboard or aluminized plastic; and the assembled reflector would have a very low profile and would be easy to transport and store. A concentric ring Fresnel reflector is disclosed in "Compact Solar Energy Concentrator" by Robert W. Hosken in Electro-Optical Systems Design, January 1975, pages 32–35. However, the Fresnel reflector described in this article provides rings which are machined into a blank of solid material. Therefore, a high degree of precision is necessary is machining the rings into the blanks with a resulting relatively high cost of manufacture.

A Fresnel reflector using separate concentric rings has been proposed in the past (for example, "EVALUATION OF SOLAR COOKERS" by Volunteers for International Technical Assistance for the U.S. Department of Commerce, Office of Technical Services). However, such a Fresnel reflector using concentric rings has several disadvantages. Each ring of the Fresnel reflector must be assembled and mounted separately, a time consuming task. Further, each reflector is composed of many separate parts. Since each ring is a separate part, there are many parts which can be misplaced or damaged.

An inexpensive, easily transportable, Fresnel reflector would also be advantageous in other areas of solar energy. For example, it could be used for low to medium temperature steam generation for producing power. It could also be used for the production of electric power by use of a Brayton or Sterling cycle generator located at the focus of the reflector. Further, direct electric power production by photovoltaic conversion would also be possible by the placement of solar cells at the focal point of the reflector. Accordingly, an inexpensive, easily transportable, Fresnel reflector would be advantageous in all areas of solar energy production.

SUMMARY OF THE INVENTION

It is therefore an object of the present invention to provide a Fresnel spiral reflector.

It is a further object of the present invention to provide a method for making a Fresnel spiral reflector.

It is a further object of the present invention to provide a Fresnel spiral reflector having a negative focal length.

It is yet a further object of the present invention to provide a Fresnel spiral reflector which may be assembled in one simple and fast operation.

It is a final object of the present invention to provide a Fresnel spiral reflector whose reflector is composed of a single piece of material.

If a mathematically defined spiral is developed on a piece of flat material and the spiral is cut along its spiral line and "wound up" the arms of the spiral will have an angle of inclination with respect to the plane of the original sheet. The angle of inclination is proportional to the distance of the arm from the center of the spiral. It has been found that the angle of inclination of this spiral would be continuously changing so that the point on the spiral would have the proper angle of inclination so as to reflect sunlight through a focal point. The present invention therefore involves the calculation of a spiral which can be formed on a sheet of flat reflecting material and which, when "wound up" will have a predetermined focal point. The spiral can be formed so that the resulting reflector will have either a positive or a negative focal length.

Such a Fresnel spiral reflector will have all of the advantages of a concentric circle Fresnel reflector and will have the additional advantages of being quickly and simply assembled and of being composed of a single piece.

The developed spiral can be formed by using a computer program to calculate a spiral which, when wound up, will provide a predetermined maximum diameter, focal length, concentration ratio, estimated blockage, reflectivity and number of mounting rods. The computer program can then be used to plot the developed spiral which can be transferred to a sheet of reflecting material, cut out, and wound up to result in the desired reflector. The wound up arms of the reflector can be held in place by radial mounting rods whose positions can be determined by the computer program.

Alternatively, a cam can be used to plot a developed spiral on a rotating sheet, this developed spiral then being transferred to a sheet of reflecting material as with the spiral developed by the computer program.

As a further alternative, the cam could be used to plot a developed spiral on the sheet of reflecting material itself. In further alternatives, the computer program could be used to generate a tape which could be used to direct a numerically controlled machine to cut out the spiral, or a stencil could be made from the spiral pattern and the stencil could be used to mass produce identical spiral patterns.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
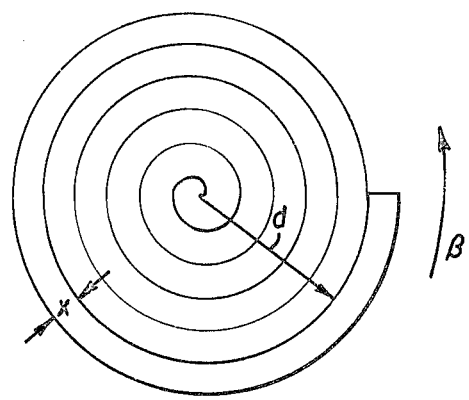
FIG. 1 is a schematic plan view of the spiral Fresnel reflector.

FIG. 1 shows a plan view of a wound up Fresnel reflector. The reflector has a projected arm width of x and the spiral is at a distance d from the center of the polar coordinate system, d varying with the angle $\beta$ of the spiral. The same reflector is shown in cross-sectional elevation in FIG. 2. As can be seen, the angle of inclination $\phi$ of each portion of the spiral reflector arm varies with the distance d of that portion of the arm from the center of the polar coordinate system. It can also be seen that the focal length of a reflected light ray which is reflected from the base of the arm portion, that base corresponding to the plotted spiral, is equal to f.

Figure 2:
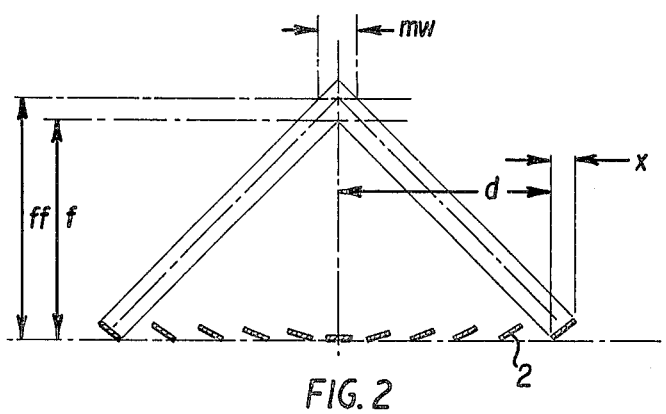
FIG. 2 is a schematic cross-sectional view of the spiral reflector of FIG. 1.
Figure 3:
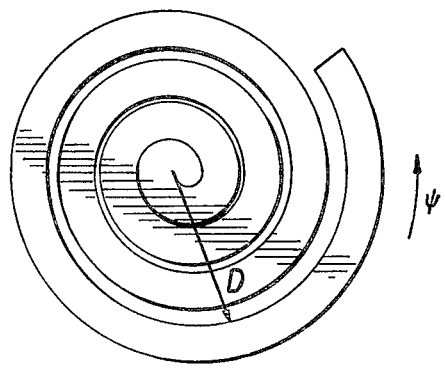
FIG. 3 is a schematic plan view of a positive focal length developed spiral.

FIG. 3 is a plan view of the spiral which is developed on a flat sheet of reflecting material in such a manner that, when cut along the spiral line and wound up, the Fresnel spiral reflector of FIGS. 1 and 2 results. The developed spiral of FIG. 3 has a distance D from the center of the polar coordinate system for any angle $\Psi$ of the spiral. In order to develop a spiral on a flat sheet of reflecting material having a desired projected arm width x and diameter d, it is therefore necessary to calculate what D and $\Psi$ corresond to a wound Fresnel spiral reflector having a projected arm width x, and a diameter d at a wound angle $\beta$.

$$D = \frac{x\beta}{2\pi \cos\left(\frac{1}{2} \text{Tan}^{-1}\left(\frac{x\beta}{2\pi f}\right)\right)} \quad (1)$$

The above equation (1) relates the distance D of the developed spiral to the desired focal length and the desired arm width at a wound up angle $\beta$.

$$\Psi = \int^\beta \left[ \left( \frac{2\pi \cos\left(\frac{1}{2}\text{Tan}^{-1}\left(\frac{x\beta}{2\pi f}\right)\right)}{x\beta} \right) \left(\left(\frac{x\beta}{2\pi}\right)^2 + \left(\frac{x}{2\pi}\right)^2 - \left(\frac{x}{2\pi \cos\left(\frac{1}{2}\text{Tan}^{-1}\left(\frac{x\beta}{2\pi f}\right)\right)}\right) + \frac{x^2\beta \sin\left(\frac{1}{2}\text{Tan}^{-1}\left(\frac{x\beta}{2\pi f}\right)\right)}{\left(4\pi^2 f + \frac{(x\beta)^2}{f}\right) \cos^2\left(\frac{1}{2}\text{Tan}^{-1}\left(\frac{x\beta}{2\pi f}\right)\right)} \right)^2 \right]^{\frac{1}{2}} d\beta \quad (2)$$

In the above equations, (2) relates the angle $\Psi$ of the developed spiral to the desired projected arm width and the desired focal length for any wound up spiral angle $\beta$. Therefore, a developed spiral can be plotted for any desired resulting spiral Fresnel reflector having a predetermined projected arm width, focal length and wound up maximum diameter.

The above equations, however, only relate to the inner most edge of a portion of the spiral arm since it is that edge which is defined by the spiral according to the above equations. However, the maximum concentration ratio is not located at the focal point of light striking the bottom of each portion of the arm but at the focal point ff of the light striking the radial center of each portion of the spiral arm. As can be seen in FIG. 2, it is at the focal length ff that the focal area is at a minimum (mw) and it is at this minimum focal width that the concentration of energy is greatest. Therefore, it is desirable to relate a developed spiral to the concentration ratio within the minimum focal width at the focal length ff. The relation between f and ff is found from equation (3).

$$f = \frac{d(ff)}{d + \frac{mw}{2}} \quad (3)$$

The minimum width (mw) from equation 3 can be found according to equation (4):

$$mw = \sqrt{\frac{(1 - G)\rho D^2}{CR}} \quad (4)$$

G is percentage of blockage
$\rho$ is reflectivity of the material

CR is concentration ratio

Figure 4:
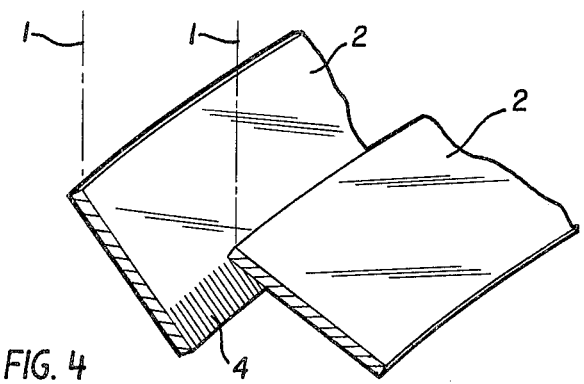
FIG. 4 is a detail of a portion of the reflector of FIG. 2.

The percentage of blocking (G) from equation (4) is most easily understood from FIG. 4. FIG. 4 shows a close up of the cross-sections of two portions of a spiral arm. It can be seen from FIG. 4 that the light rays 1 reflected from each portion of the spiral arm 2 may be partially blocked by an adjacent portion of the spiral arm. The percentage of the blocked area 4 is represented by (G). The concentration ratio (CR) of equation 4 is simply the ratio, expressed in terms of "suns" by which the energy of the sun is multiplied within the minimum focal width (mw).

Further, the projected arm width is not a parameter which one would normally be initially aware of in order to produce a reflector having certain characteristics. The projected arm width can be found from equation (5) once (mw) and (ff) are found:

$$x = \frac{mw}{\left[1 + \left(\text{Tan}\left(\tfrac{1}{2}\text{Tan}^{-1}\left(\frac{d + \frac{mw}{2}}{ff}\right)\right)\right)\right] \frac{d + \frac{mw}{2}}{ff}} \quad (5)$$

Therefore, the above equations provide a complete description of a developed spiral given an input of the maximum desired diameter, the desired focal length, the desired concentration ratio, the desired estimated blockage and the reflectivity of the reflector. An appropriate computer program can then find the minimum focal width (mw) for the outermost point of the spiral from equation (4), the projected arm width x from equation (5) and the focal length of the inner edge of each point in the spiral f from equation (3). From these parameters, the developed spiral can be plotted from equations (1) and (2).

An additional equation which may be useful in plotting the developed spiral is the equation relating the change of the diameter of the wound up spiral to the angle $\beta$. Such a relationship is expressed by equation (6):

$$\frac{dD}{d\beta} = \frac{x}{2\pi \cos\left(\tfrac{1}{2}\text{Tan}^{-1}\left(\frac{x\beta}{2\pi f}\right)\right)} + \frac{x^2\beta \sin\left(\tfrac{1}{2}\text{Tan}^{-1}\left(\frac{x\beta}{2\pi f}\right)\right)}{\left(4\pi^2 f + \frac{(x\beta)^2}{f}\right)\cos^2\left(\tfrac{1}{2}\text{Tan}^{-1}\left(\frac{x\beta}{2\pi f}\right)\right)} \quad (6)$$

Figure 5:
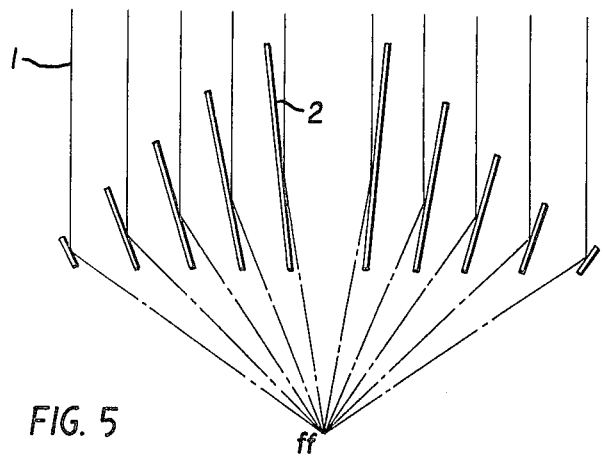
FIG. 5 is a schematic cross-sectional view of a negative focal length spiral Fresnel reflector.
Figure 6:
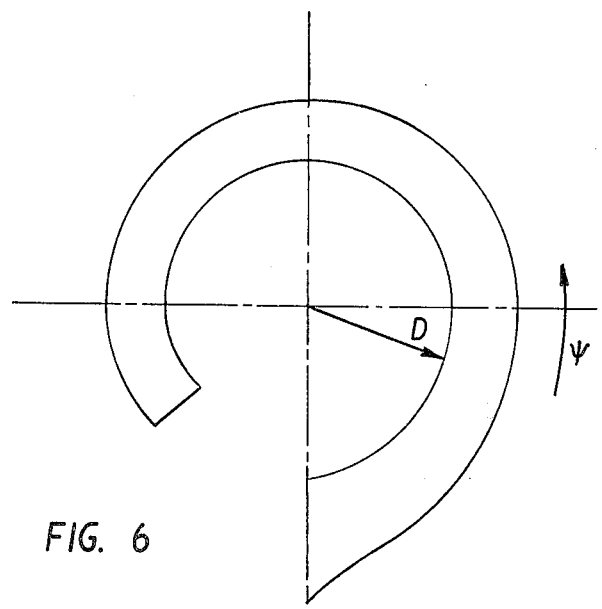
FIG. 6 is a schematic plan view of a negative focal length developed spiral.

The above equations describe a spiral Fresnel reflector having a positive focal length as seen in FIG. 2. FIG. 5 schematicaly illustrates a spiral Fresnel reflector having a negative focal length while FIG. 6 illustrates a developed negative focal length spiral which may be plotted on a flat sheet of reflective material. As can be seen from FIG. 5 which is a cross-sectional view through a wound up spiral, the focal point of the reflected light in a negative focal length spiral Fresnel reflector is on the opposite side of the reflector from the incoming light. Further, the angles that the spiral arms 2 make with the horizontal plane are much greater than those of a positive focal length reflector. Further, as can be seen from FIG. 6, a negative focal length reflector must be wound in a direction opposite to that of a positive focal length reflector so that the outer coils of the developed spiral become the inner most coils of the wound spiral reflector. The developed spiral for the negative focal length Fresnel spiral reflector can be developed in a method similar to that for the positive focal length reflector except that equations 1, 2 and 6 are respectively replaced by equations 7, 8 and 9 below:

$$D = \frac{x\beta}{2\pi \sin\left(\tfrac{1}{2}\text{Tan}^{-1}\left(\frac{x\beta}{2\pi f}\right)\right)} \quad (7)$$

$$\Psi = \int^\beta \sqrt{\frac{d^2 + \left(\frac{x}{2\pi}\right)^2 - \left(\frac{dD}{d\beta}\right)^2}{D}}\, d\beta \quad (8)$$

$$\frac{dD}{d\beta} = \frac{x}{2\pi \sin\left(\tfrac{1}{2}\text{Tan}^{-1}\left(\frac{x\beta}{2\pi f}\right)\right)} - \frac{x^2\beta \cos\left(\tfrac{1}{2}\text{Tan}^{-1}\frac{x\beta}{(2\pi f)}\right)}{\left(4\pi^2 f + \frac{(x\beta)^2}{f}\right)\sin^2\left(\tfrac{1}{2}\text{Tan}^{-1}\left(\frac{x\beta}{2\pi f}\right)\right)} \quad (9)$$

Figure 7:
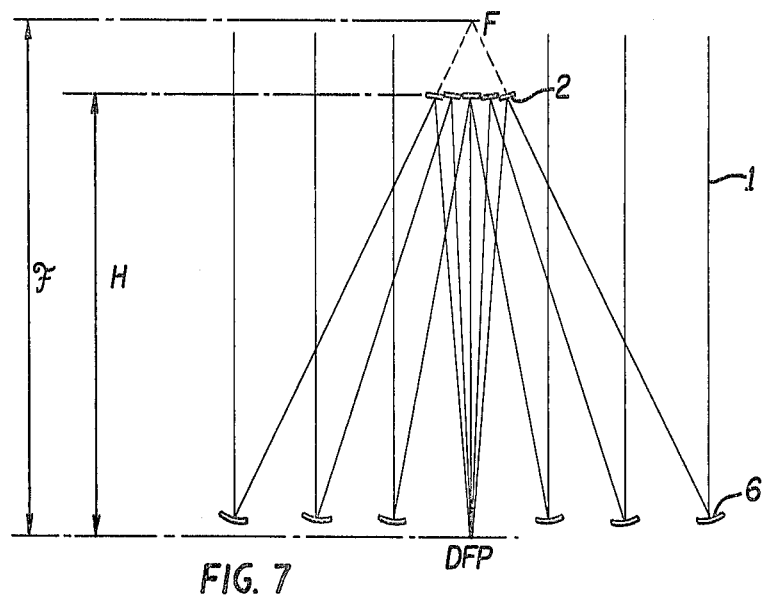
FIG. 7 is a schematic elevational view of a spiral Fresnel reflector reflecting coverging light rays from a plurality of mirrors.

Although the spiral Fresnel reflector will typically be used to concentrate the direct rays of the sun, and the above equations provide a spiral reflector for so concentrating parallel rays, the spiral Fresnel reflector can also be used as a secondary reflector for concentrating converging rays, as for example the rays reflected from a field of mirrors. FIG. 7 is a schematic representation of a spiral Fresnel reflector 2 located between a field of reflecting mirrors 6 and the apparent focal point F of the field of mirrors. The Fresnel spiral reflector 2 is located at a height H from the field of mirrors and the apparent focal point F of the field of mirrors is at a height $F$ from the field of mirrors 6. A spiral Fresnel reflector which will concentrate the converging rays at desired focal point DFP can be formed from a developed spiral plotted from the above equation (2) where f is found from the following equations (10) and (11):

$$f = \left(\frac{x}{2\pi\beta}\right) \text{Tan}\left[\left(\frac{\pi}{2} - \left(\text{Tan}^{-1}\left(\frac{x\beta}{2\pi F}\right)\right)\right) + \text{Tan}^{-1}\left(\frac{x\beta}{2\pi H}\right)\right] \quad (10)$$

$$F = d \max \frac{F}{D} \quad (11)$$

Therefore, using equations (10) and (11), one need only preselect the desired heights H and $F$ as well as the other desired parameters such as the maximum desired diameter, focal length, concentration ratio, estimated blockage and the reflectivity of the reflector in order to plot a developed spiral which may be wound up to form a spiral Fresnel reflector usable with converging light rays.

Figure 8:
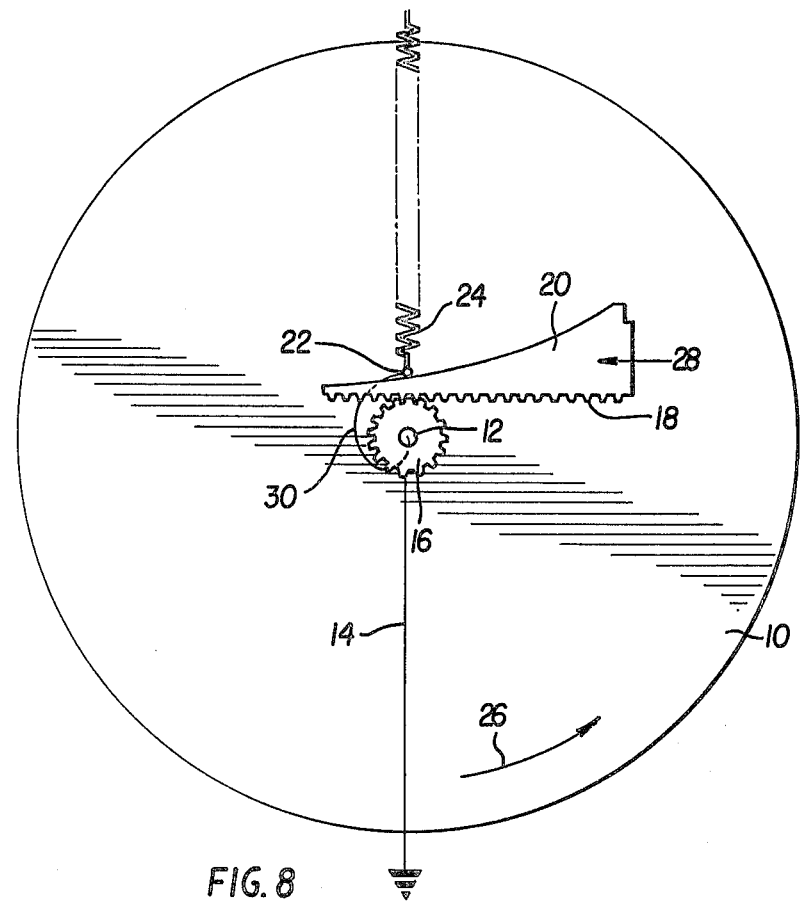
FIG. 8 is a schematic representation of an apparatus for plotting a spiral on a sheet of material.

An alternative method of plotting the developed spiral for the spiral Fresnel reflector is by use of the apparatus shown in FIG. 8. FIG. 8 illustrates a schematic representation of a mechanical device for plotting a developed spiral. A piece of flat reflective material 10, or a stencil, is position for rotation about axis 12. The axis 12 is supported for rotation on rigid guide 14 and includes a pinion 16. The pinion 16 meshes with a rack 18 connected to cam 20 which guides pin 22 against the reaction force of spring 24. Therefore, when material 10 is rotated in the direction 26, or when cam 20 is moved in the direction 28, the rotation of the material and the movement of the pin 22 due to the cam 20, cause the pin to describe the spiral 30 on the material 10. The shape of the cam 20 can be predetermined based upon the equations. This method for developing the spiral is useful when a large number of identical spirals are to be produced.

Once the developed spiral is plotted, the developed spiral may be transferred to a sheet of flat reflective material such as aluminized flexible plastic or aluminized mylar bonded to low molecular weight polyethylene or any other reflective sheet material. The developed spiral can also be plotted directly onto the reflective material. Once the developed spiral is plotted on the reflective material, the reflective sheet is cut along the spiral line.

Other material which may be usable for the spiral Fresnel reflector are masonite (such as $\frac{1}{8}''$ thick masonite) having aluminum foil glued to one side, thin aluminum sheet and cardboard having an aluminum foil reflective surface.

Once the developed spiral has been cut, it is necessary to wind up the developed spiral in order to result in the spiral reflector. In the case of a positive focal length Fresnel spiral reflector, the outermost portion of the spiral arm of the developed spiral is placed at a fixed distance from the center of the spiral and the center of the spiral is wound up. In the case of a negative focal length spiral Fresnel reflector, the innermost end of the developed spiral is placed at a fixed distance from the center of the spiral reflector and the outermost end of the developed spiral, which is the innermost end of the spiral Fresnel reflector, is wound up. The degree of winding determines the angle of inclination of the arms of the spiral, and therefore determines the focal length of the resulting reflector. It is therefore possible to make minor changes in the focal length by performing minor adjustments upon the degree of winding up the arms of the spiral reflector.

Figure 9:
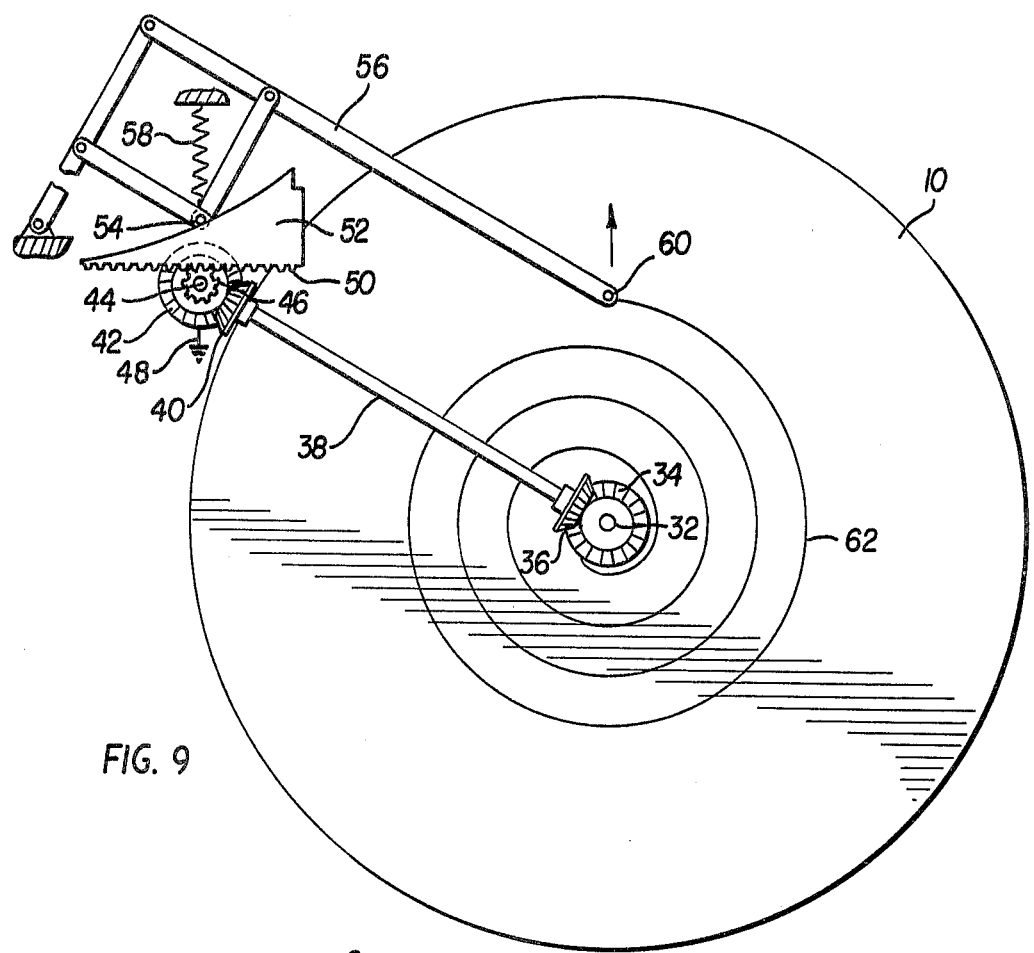
FIG. 9 is another embodiment of the apparatus of FIG. 8.

Another version of the apparatus for plotting the developed spiral of FIG. 8 may be seen in FIG. 9. This device is useful for forming large reflectors of varying diameters. The blank sheet 10 is fixed for rotation on axis 32 which includes bevel gear 34. Bevel gear 34 meshes with bevel gear 36 which is mounted on splined shaft 38 for axial movement only. Bevel gear 40 is mounted on the other end of splined shaft 38 and meshes with bevel gear 42 which is mounted on axis 44 together with pinion 46. The axis 44 is fixed by guide pin 48. Pinion 46 meshes with rack 50 attached to cam 52. Cam follower 54 of linkage 56 is guided by cam 52 against the reaction force of spring 58 as the cam 52 is moved. This results in the movement of pin 60 which describes spiral 62 in a manner similar to the device of FIG. 8. The pinion gears 36 and 40 can move along splined shaft 38 so as to accommodate spirals of different sizes.

Once the developed spiral is wound into the resulting spiral Fresnel reflector, it is necessary to stabilize the arms and maintain them in their proper position with the desired amount of winding. Preferably, this may be done by the use of radial connecting arms which radiate from the center of the spiral and attach to the arms of the spiral at radial points. Such radial arms 70 may be seen in FIG. 10. The spiral arms 2 may be attached to the connecting arms 70 at attachment points 72. Although four connecting arms are shown in FIG. 10, any number can be used.

According to a preferred method, the attachment points may be plotted on the developed spiral and the Fresnel spiral reflector may be wound up from the developed spiral simply by the attachment of the attachment points 72 to their appropriate connecting arms 70. The plotting of the appropriate attachment points on the developed spiral may be done by determining the number of connecting arms to be used, calculating the angle $\beta$ between the connecting arms, and utilizing equation 2 or 8 to calculate the angle $\psi$ on the developed spiral for each connecting point.

Figure 11:
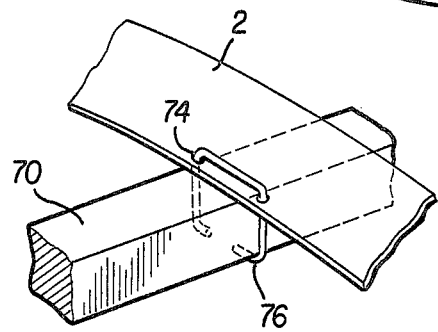
FIG. 11 is a detail of the connection between one of the connecting rods and the spiral.

The connection of the spiral arms 2 to the connecting rods 70 at the connecting points 72 must be done in such a way that the spiral arms are not distorted at the connection points. According to a preferred embodiment, this may be done by creating two holes 74 in the innermost portion of the spiral arms at each connecting point. A U shaped length of aluminum or stainless steel wire may then be slid through the holes so that the base of the U connects the two holes as shown in FIG. 11. The arms of the U which extend past the bottom of the connecting rod may then be bent inwards as shown at 76 in FIG. 11. This provides a pivot for the spiral arm to pivot about its innermost edge.

Figure 12:
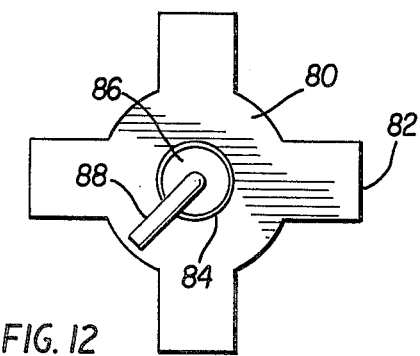
FIG. 12 illustrates one embodiment of the centerpiece for the connecting rods of FIG. 10.
Figure 10:
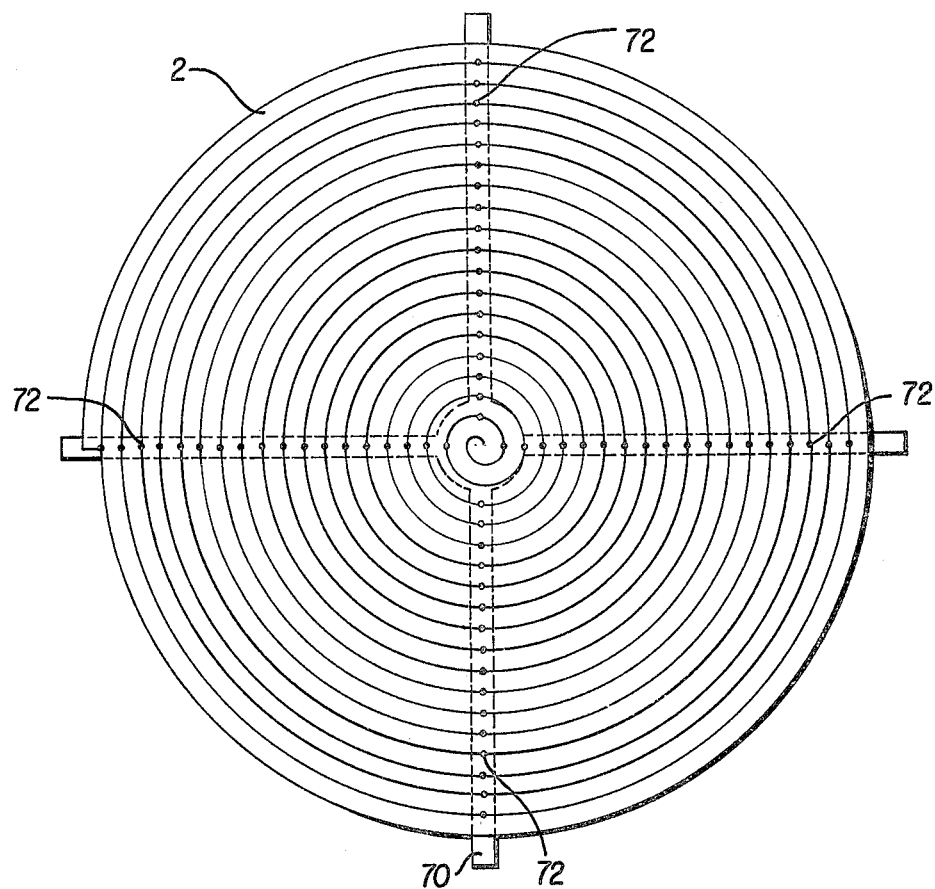
FIG. 10 is a plan view of a connecting rod arrangement.

FIG. 10 shows the connecting rods as being formed of a single piece of material. Alternatively, the connecting rods may be fixedly attached to a separate center piece 80 at 82 as shown in FIG. 12. The center piece may include a central bore 84 in which may be positioned a dowel plug 86 and turning handle 88. The end of the developed spiral may be placed in the dowel plug 86 and the dowel plug 86 turned for winding up the developed spiral into the spiral Fresnel reflector. Using such a technique, one end of the developed spiral is fixed a predetermined diameter from the dowel plug while the other end is inserted into the dowel plug and wound until the fixing points 72 are aligned with their appropriate connecting rods 70.

The center piece need not include a central bore and dowel. In such a case, the spiral may be wound up by first attaching the outermost point of the spiral to one of the connecting rods. The spiral is then wound at its next innermost strip until its fixing point falls into line with the connecting rod and this fixing point is then fixed to the connecting rod. The winding is continued and succeedingly inner arms of the spiral are attached to the connecting rod along a radial line reaching the center of the spiral, and then outwards to the opposite edge. Once a full diameter of the spiral has been fixed to the connecting rods, the other fixing points are mounted.

The frame for stabilizing the wound spiral need not be in the form of radial connecting arms but, rather, may be in the form of a frame defining a grid. Such a grid would be easier to manufacture and have greater strength the the radial arm frame arrangement.

Figure 14:
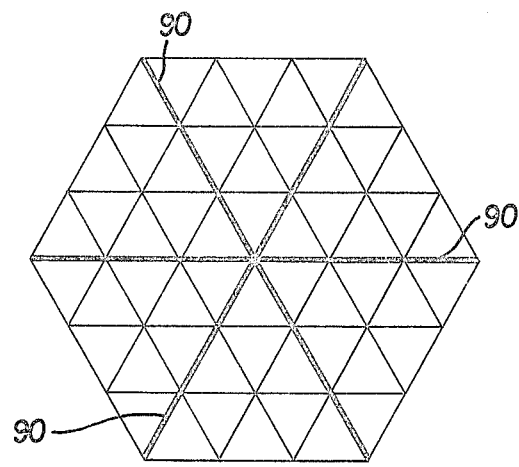
FIG. 14 illustrates a frame defining an equilateral triangle grid.

One form of such a grid is shown in FIG. 14. This is a grid compose of equilateral triangles. The arms of some of the equilateral triangles form intersecting rods 90 which could be the primary mounting points for the spiral. The spiral could also be attached at other mounting points where it crosses the grid.

Figure 15:
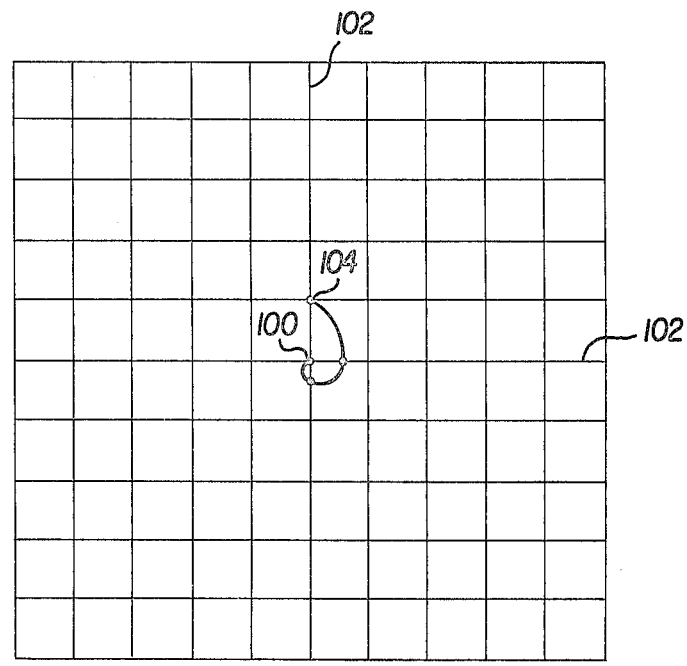
FIG. 15 illustrates a frame defining a square grid.

A second form of grid is illustrated in FIG. 15. This is a grid composed of a plurality of squares. The grid has a center point 100 from which radial rods 102, which are defined by the arms of some of the squares, extend. The spiral could be mounted at fixing points 104 to these radial arms, as well as to other points on the grid where the edge of the spiral crosses the grid. Other grid shapes are, of course, also possible.

EXAMPLE

Figure 13:
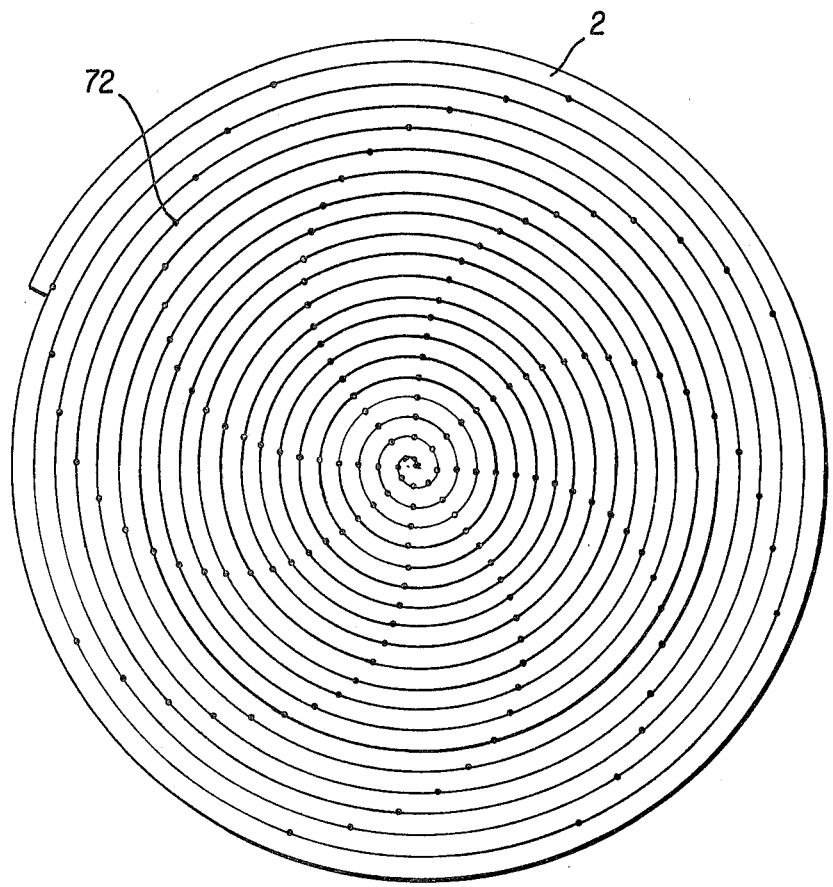
FIG. 13 is a plot of a developed spiral produced by a computer.

It was desired to construct a spiral Fresnel reflector having a radius of 22.5", a focal length of 42.75", a maximum theoretical concentration ratio of 1000 and 8 mounting arms. These parameters were introduced into equations 1–6 which provided an arm width of 1.078", a flat radius of 23.175" and a minimum focal width of 1.21". A computer was used to plot the above developed spiral as shown in FIG. 13. The spiral was cut along its spiral line and holes for the mounting wire were cut into the spiral. The connecting arms were then constructed which were made from square tubing connected at a central point to a plywood center piece by square nuts and washers. The spiral arms were then connected to the connecting rods by the wires 76 as described above. The resulting apparatus was tested at 5:00 in the afternoon on a sunny day and a concentration ratio of 500 suns was measured.

The wound spiral need not be in the form of a flat plane. The wound Fresnel reflector can also be in the form of a hollow cone or a hollow truncated cone. This may be done by providing a frame in the form of a hollow cone or the frustum of a cone. As with the flat spiral Fresnel reflector, the spiral could be cut from a single sheet of flat material and wound up onto the conical frame. The angle of inclination of any point on the wound conic spiral would be set so as to reflect light through a chosen focal point f.

Figure 17:
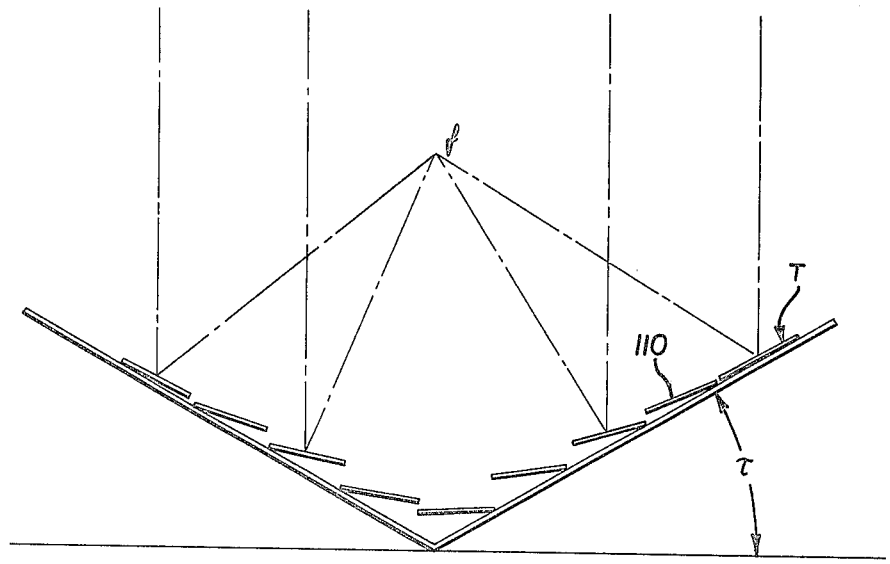
FIG. 17 is a cross-sectional view of a type A conic reflector.

There are at least four different types of conical spiral Fresnel reflectors possible. A first type of conical reflector has an entirely conic support frame having a frame angle $\tau$ which is greater than the angle of inclination of the spiral arm at a given radial point. This is referred to as a type (A) reflector. Such a type (A) reflector is shown in FIG. 17. As seen in FIG. 17, which is a cross-sectional view through the reflector, the angle of inclination of the arms at any point is less than the angle of inclination $\tau$ of the frame up to the transitional point T. Therefore, the arms are fixed to the frame at their outermost radial point. If the reflector were to continue radially outwards beyond the transitional point T, the angle of inclination of the arms would be greater than the angle $\tau$. This portion of the reflector would be a type (B) reflector.

Figure 16:
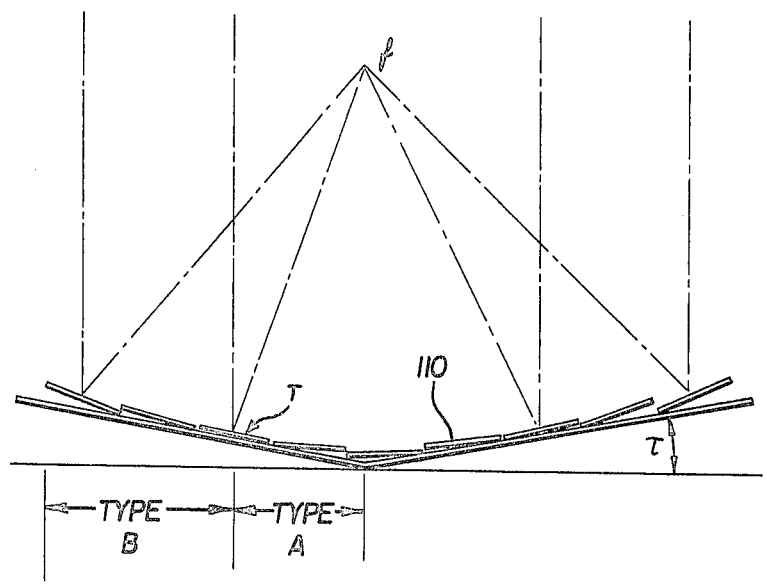
FIG. 16 is a cross-sectional view of a type A-B conic reflector.

FIG. 16 shows a conical spiral Fresnel reflector which is a combined type (A) and type (B) reflector. As can be seen in FIG. 16, the reflector extends radially outward beyond the transitional point T where the angle of inclination of the spiral arms is greater than the angle $\tau$. In such a type (B) portion of the reflector, the arms are fixed to the frame at their radially innermost edges.

Figure 18:
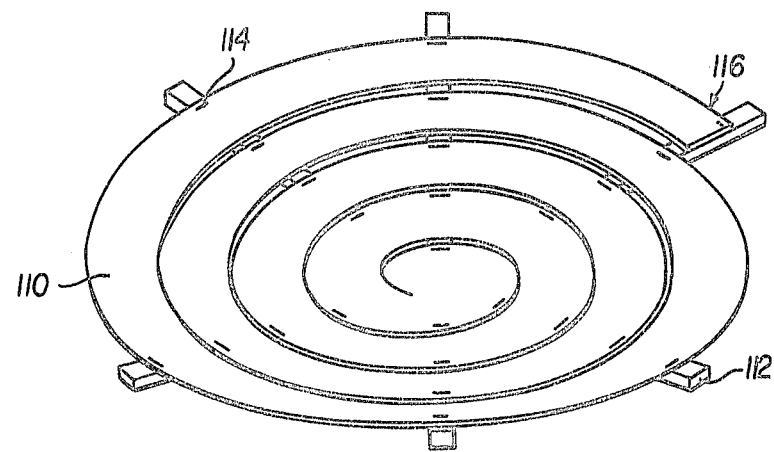
FIG. 18 is an isometric view of the reflector of FIG. 17.

It should be noted that in a pure type (A) conical reflector, the transitional point T need never be reached. That is, the reflector may terminate radially at a point short of the point where the angle of inclination of the reflector arms equals the angle $\tau$. In the case where the outermost arm of the spiral does have an angle of inclination which equals the angle $\tau$, so that the transitional point is reached, the outermost arm may be fixed flat to the support arm. Such an arrangement is shown in FIG. 18. In this Figure, the frame is in the form of a plurality of radially extending rods 112 having a quadrilateral cross section. The arms of the spiral are secured at fixing points 114 located at the outermost edges of the spiral arms. As can be seen at 116, the outermost arm of the spiral, which is at the transition point, is secured at both its innermost and outermost edges.

Figure 19:
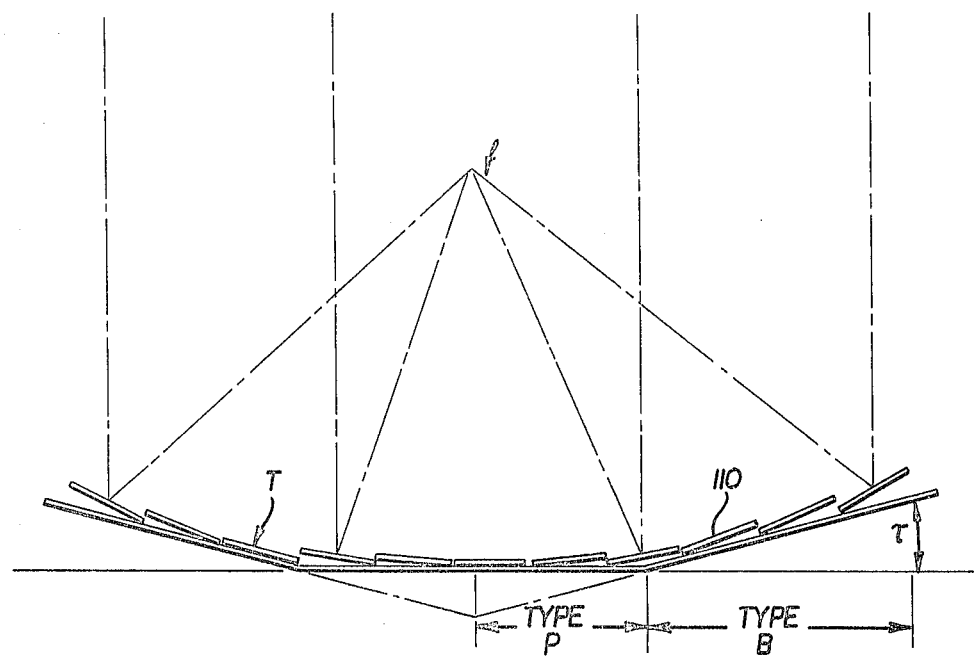
FIG. 19 is a cross-sectional view of a type P-B conic reflector.

The type (A) reflector will have no blockage or shadowing of one portion of the reflector arm by the radially inwardly adjacent portion of the arm. However, since the effective focal length of the strips decreases as the strips move out from the center and up the conical support frame, the light reflected from the outer strips impinges on the focal plane at shallower angles. This increases the focal spot diameter, thereby reducing the concentration ratio obtained.

Where a portion of a conical spiral Fresnel reflector is planar (that is, in the truncated portion of a truncated cone), this planar type is referred to as a type (P) reflector. FIG. 19 illustrates a combined type P-B reflector in which the radially innermost portion of the frame is planar and the remainder of the frame is conical but with an angle $\tau$ which is less than the angle of inclination of the spiral arms at the radial distance of the conical frame. In such a P-B reflector, the support frame changes from the planar support to the conic support at the transition point T. As seen in FIG. 19, the angle $\tau$ is equal to the angle of inclination of the spiral arm at the transition point T.

Figure 20:
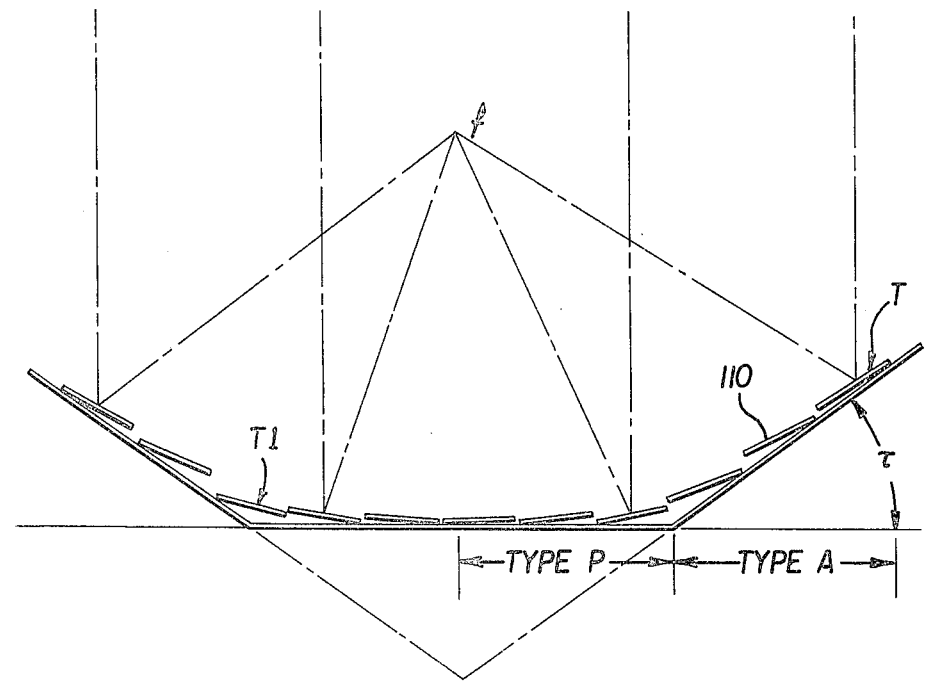
FIG. 20 is a cross-sectional view of a type P-A conic reflector.

A fourth type of conical spiral Fresnel reflector is the type "P-A" shown in FIG. 20. In this type of reflector, the angle T is such that the transition point is not where the planar frame changes to the conic frame, but at, or beyond, the outermost radial point of the spiral arm. A second type of transition point T1 occurs where the planar frame intersects with the conic frame section. As can be seen from FIG. 20, in the (P) portion of the reflector, the spiral arms are fixed to the frame at their innermost edges. At the (A) portion of the reflector, the spiral arms are fixed to the frame at their outermost edges. This second type of transitional point T1 occurs where both the innermost edge and the outermost edge of the spiral arm contact the frame adjacent the intersection of the planar and conic sections thereof.

It is important to note that the outer arms of the type (P), or planar, spiral Fresnel reflector experience the greatest blockage and contribute the most to the total area of the reflector. The type P-A reflector eliminates blocking entirely for those spiral arm portions which are attached to the conic frame portion, that is, the outermost arms. This will tend to increase the concentration ratio obtained by the type P-A reflector over that obtained by a type (P) reflector having the same diameter, focal length and projected arm width. On the other hand, the outermost strips of the P-A reflector will be at a higher angle of inclination than those of similar type P reflector. This will tend to enlarge the minimum focal width for the type P-A reflector, reducing the concentration ratio obtainable. Therefore, the type P-A conic Fresnel reflector includes aspects which increase the obtainable concentration ratio as well as other aspects which decrease the obtainable concentration ratio. With the proper selection of design parameters, it is possible for one skilled in the art to optimize the type P-A reflector so that the obtainable concentration ratio is maximized.

Obviously, numerous modifications and variations of the present invention are possible in light of the above teachings. It is therefore to be understood that within the scope of the appended claims, the invention may be practiced otherwise as specifically described herein.

What is claimed as new and desired to be secured by Letters Patent of the United States is:

1. A method for forming a substantially Fresnel reflector, said method comprising the steps of:
   forming a flat reflective spiral of a predetermined shape;
   winding said spiral about an axis normal to the plane of said flat spiral whereby said spiral becomes angled to said plane in the radial direction so as to form a substantially Fresnel reflector having a focal area, and
   terminating said winding when said spiral defines a desired focal area.

2. A method for forming a substantially Fresnel reflector, said method comprising the steps of:
   providing a spiral pattern of a predetermined shape on a flat sheet of reflecting material, said shape being such that, when cut and wound, said spiral forms a substantially Fresnel reflector
   cutting said flat along said spiral pattern to form a flat spiral of reflecting material; and
   winding said spiral about an axis normal to the plane of said flat sheet to a degree sufficient that said spiral defines a desired focal area, whereby said spiral becomes angled to said plane in the radial direction so as to form a substantially Fresnel reflector having said focal area.

3. The method of claim 2 wherein said spiral is wound by positioning the radially innermost portion of said spiral on said axis and turning said radially innermost portion of said spiral about said axis while maintaining the outer diameter of said spiral at a constant value and wherein said reflector has a positive focal length.

4. The method of claim 2 wherein said spiral is wound by positioning the radially outermost portion of said spiral on said axis and turning said radially outermost portion of said spiral about said axis while maintaining the outer diameter of said spiral at a constant value and wherein said reflector has a negative focal length.

5. The method of claim 2 wherein said wound spiral is maintained with a fixed degree of winding by providing portions of said spiral with a plurality of fixing means and connecting said fixing means with a plurality of rigid connectors.

6. The method of claim 2 wherein the shape of said spiral pattern and the degree of winding of said spiral are determined as a function of the characteristics of the resulting spiral reflector such that said resulting reflector will be a substantially Fresnel reflector.

7. The method of claim 6 wherein said spiral pattern is plotted by a computer having said characteristics programmed therein.

8. The method of claim 6 wherein said spiral pattern is plotted on a flat sheet rotating about an axis, the means for plotting said pattern on said flat sheet being movable in response to a cam actuated by the rotation of said sheet.

9. The method of claim 2 including the step of holding said wound spiral in a wound condition by a plurality of connecting rods, said connecting rods radiating from the center of said wound spiral and being connected to said wound spiral at those points where the radial connecting rods and the arms of said spiral intersect.

10. The method of claim 2 including the step of holding said wound spiral in a wound condition by a plurality of connecting rods, said connecting rods being in the form of a rectangular grid, said wound spiral being connected to said grid at the points where said connecting rods and said spiral intersect.

11. The method of claim 2 including the step of holding said wound spiral in a wound condition by a plurality of connecting rods, said connecting rods being in the form of an equilateral triangular grid, said wound spiral being connected to said grid at the points where said connecting rods and said spiral intersect.

12. The method of claim 9 wherein said radial arms are connected to a centerpiece at said axis normal to the plane of said flat sheet, said spiral is connected to a portion of said centerpiece and said spiral is wound up by rotating said portion of said centerpiece.

13. A substantially Fresnel spiral reflector comprising:
   a spiral length of flat reflective material, said spiral length having an inner end and an outer end, one of said ends being fixed and the other of said ends being circumferentially wound up in the direction of said spiral by a predetermined degree, said predetermined degree being such that the turns of said wound spiral define a predetermined focal area
   whereby each circumferential portion of said spiral is tilted in the radial direction from the plane of said spiral to focus light reflected from said spiral onto said focal area.

14. The reflector of claim 13 including a centerpiece in the center of said spiral and a plurality of connecting rods radiating from said centerpiece in the plane of said reflector, said connecting rods being connected to said spiral at their points of intersection.

15. The reflector of claim 14 wherein said centerpiece includes rotatable winding means to which one end of said spiral may be attached.

16. The reflector of claim 14 wherein said connecting rods are connected by connecting means to the radially innermost portions of said spiral.

17. The reflector of claim 13 including a reflector support in the form of a rectangular grid to which the arms of said spiral may be attached at the points of intersection of said arms and said grid.

18. The reflector of claim 13 including a support frame for said reflector wherein said support frame is in the form of an equalateral triangular grid, the arms of said spiral being attached to said grid at the points of intersection of said arms and said grid.

19. The reflector of claim 13 wherein said reflector has a positive focal length.

20. The reflector of claim 13 wherein said reflector has a negative focal length.

21. The reflector of claim 13 wherein said reflector is adapted to focus non-parallel light rays.

22. The spiral reflector of claim 13 wherein said spiral reflector is substantially planar.

23. The spiral reflector of claim 13 wherein said spiral reflector is in the form of a hollow cone.

24. The spiral reflector of claim 23 wherein said cone is truncated so that the radially innermost portion of said reflector is substantially planar.

25. The spiral reflector of claim 23 including reflector support means in the form of a hollow cone.

26. The spiral reflector of claim 24 including a support means for said reflector in the form of a hollow truncated cone.

27. The reflector of claim 13 wherein the radial width x of the arms of said spiral is defined by:

$$x = \left[\frac{mw}{1 + \left(\mathrm{Tan}\left(\frac{1}{2}\mathrm{Tan}^{-1}\left(\frac{d + \frac{mw}{2}}{ff}\right)\right)\right)\frac{d + \frac{mw}{2}}{ff}}\right]$$

wherein ff is the focal length of said predetermined focal area d is the diameter of said reflector at any wound angle and wherein mw is the width of said predetermined focal area.

28. The reflector of claim 16 wherein said connecting means are constructed to permit radial motion of said spiral relative to said connecting rods and to prevent circumferential motion of said spiral relative to said connecting rods.

29. The reflector of claim 28 wherein said connecting means comprise clips fixed to said spiral and slidingly engaging said connecting rods.

\* \* \* \* \*